S. J. NEWSHAM, W. H. HAINES & W. S. HENSON.
MANUFACTURE OF ICE.
No. 108,816.   Patented Nov. 1, 1870.
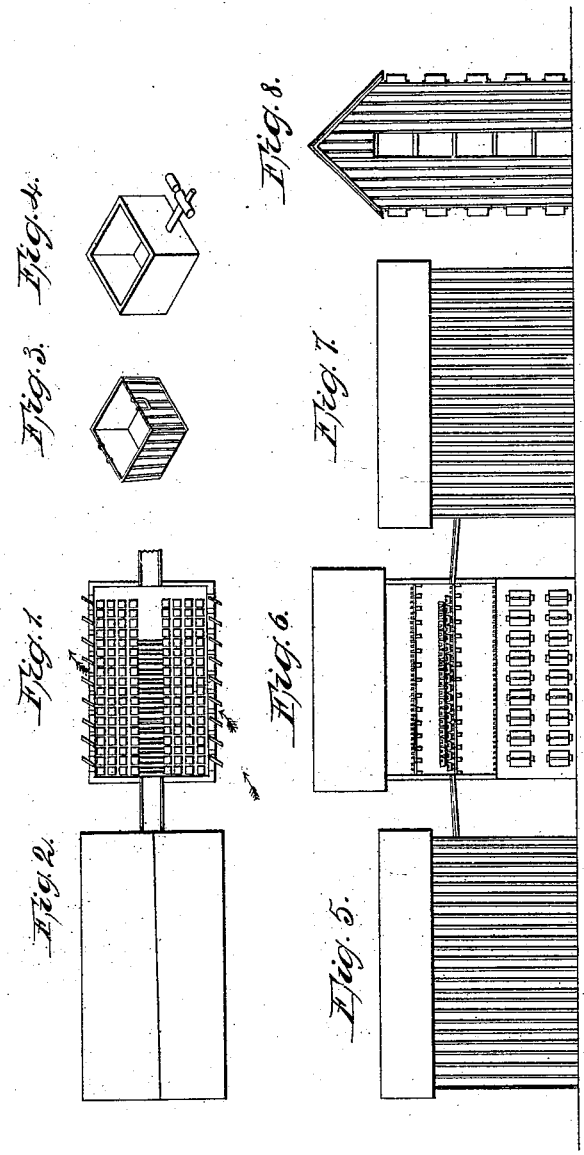

UNITED STATES PATENT OFFICE.

SYDNEY JAMES NEWSHAM, OF MONT CLAIR, AND WILLIAM H. HAINES AND WILLIAM S. HENSON, OF NEWARK, NEW JERSEY.

IMPROVEMENT IN THE MANUFACTURE OF ICE.

Specification forming part of Letters Patent No. 108,816, dated November 1, 1870.

We, SYDNEY JAMES NEWSHAM, of Mont Clair, county of Essex, WILLIAM H. HAINES, of the city of Newark, and WILLIAM S. HENSON, also of the city of Newark, county of Essex, State of New Jersey, respectfully represent that we have made certain Improvements in the Mode of Producing Ice, of which the following is a specification:

The first part of our invention relates to the mode of freezing water in bags made of textile fabrics or felt, and of a porous nature, and having ribs, of wood or metal, attached to hold them in their desired form; or the bags may be inserted within suitable frames made of wood or metal, or other suitable material, to which the bags may be permanently attached or not, as may be deemed most desirable, the object being to expose a larger surface of the water to be frozen to the action of the cold atmosphere during the winter season, and to dispense with the use of ponds, lakes, and other large sheets of water, yet produce the ice in large quantities for commercial purposes, and avoid, to a large extent, the expense of conveyance, by producing the ice in the neighborhood of the market or place of consumption; also, to enable private individuals to fill their own ice-houses without having ponds; and the freezing, being done under the shade of a roof, will not be interrupted by the sun, and can be successfully carried on when ponds, lakes, and rivers are not sufficiently frozen during mild winters, and, therefore, ice can be produced at a lower cost than by the natural process of collection from open waters, which is frequently checked by sun, by snow, and warm springs. The second part of our invention relates to the mode of extracting the frozen masses of ice from the bags by rapidly melting the surfaces of the blocks of ice inside a chamber or box of wood or metal, or other suitable material, heated by hot air from a furnace, or steam from a steam-boiler, or by means of hot water, and causing the blocks of ice to become separated from the bags in which they were frozen, when they will be immediately removed to the store-house and the process be repeated.

Figure 1 of the drawings represents a plan of a building, and Fig. 6 an elevation of the same; and Fig. 8, an end view, the upper part in Fig. 6 being shown without the side walls, and having an abundance of openings for the admission of the cold air from without, in which may be seen a considerable number of the bags and frames arranged two deep, and in several rows, the building being also provided with shutters turning on pivots or hinges, and capable of being fixed in any desired position for causing any wind that may happen to be blowing to pass through the building. Fig. 2 is a plan of an ice-house for storing ice; and Figs. 5 and 7 are elevations of similar storehouses in near proximity, and having gangways for transmitting the ice from the freezing-house to the store-houses. Fig. 3 represents one of the freezing-bags attached inside a wooden frame, having handles for lifting and carrying the same, and made larger at the top than the bottom. Fig. 4 represents a box large enough to contain the frame and bag, and made either of wood or metal, and having a steam-pipe and stop-cock fitted, to which, in practice, a flexible hose will also be attached, and having the other end of the hose connected to a small steam-boiler.

The mode of proceeding is as follows: Suitable freezing and store houses being located near a good spring or well, or other good supply of water, we take a number of the bags and frames, the bags being attached to the frames on the upper side, and ranged inside of the freezing-house on one or more floors, where it is most convenient, as shown, Figs. 1 and 6, for transferring the ice into the store-houses. They are then filled nearly full of water, either by hand or by means of suitable pipes, and after a sufficient exposure to the cold air, which must, of course, be below 32° Fahrenheit, they will become frozen solid. Men will then remove them, one at a time, to the gangway, where the steam-box, Fig. 4, will be placed over them, and, the cock being opened a short time, the block of ice will rapidly melt on the outer surfaces and become detached from the bag, and when the bag and frame are turned upside down upon the gangway, and then lifted off the block of ice, the latter will slide into the ice house or store, providing the gangway is at a suitable incline and properly made;

and the men will immediately replace the empty bags with their frames and refill them with water, as before. By this method, providing the bags are of suitable size, say about two feet square and about twelve or eighteen inches deep, and at suitable distances apart, say from two to twelve inches, (not unnecessarily taking too much room,) about four times the amount of surface may be exposed to freeze by the action of the cold air than is possible on a pond where the upper surface only is exposed; and the porous nature of the canvas bags (which we prefer) causes them to freeze as rapidly on the sides and bottoms as on the surfaces, as the evaporation from the wet or damp surfaces, when acted upon by even a slight wind, reduces the temperature several degrees, as is well known.

The bags might be made of india-rubber cloth, or japanned or oiled cloths, but these, not being porous, would not be so good as the canvas or felt; therefore, we give the canvas the preference, as being the cheapest and strongest, and better than any other material for the purpose, being better than metal pans, which have been used before, and which take longer to freeze the water in consequence of the absence of evaporation from the sides and bottoms.

The canvas bags and frames also expand with the ice without injury to either, and they are easy to handle cheap to make.

We do not claim the use of metallic pans or vessels made of good conductors of heat, as that has been done before, (vide C. M. Keller and J. Henderson, patent issued in the week ending September 12, 1865;) but

We claim as our invention—

1. Canvas or felt bags and frames of suitable material for holding water for freezing into ice, substantially as shown, in the manner hereinbefore set forth.

2. The chamber or box heated by hot air or hot water or steam, for the purposes hereinbefore mentioned, substantially as described.

SYDNEY JAMES NEWSHAM.
W. H. HAINES.
WM. S. HENSON.

Witnesses:
WM. BRADSHAW,
G. M. COBB.